(12) United States Patent
Harris

(10) Patent No.: US 8,312,123 B2
(45) Date of Patent: Nov. 13, 2012

(54) ADDRESS SHARING NETWORK

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 236 days.

(21) Appl. No.: 12/614,398

(22) Filed: Nov. 7, 2009

(65) Prior Publication Data

US 2011/0113130 A1    May 12, 2011

(51) Int. Cl.
*G06F 15/16*    (2006.01)
(52) U.S. Cl. ........ 709/223; 709/203; 709/226; 370/411; 370/475
(58) Field of Classification Search .................. 709/223, 709/203, 226; 370/411, 475
See application file for complete search history.

(56) References Cited

U.S. PATENT DOCUMENTS

| | | | | |
|---|---|---|---|---|
| 5,278,829 A | * | 1/1994 | Dunlap | 370/257 |
| 6,944,167 B1 | * | 9/2005 | McPherson | 370/401 |
| 7,072,800 B1 | * | 7/2006 | Fernandez et al. | 702/186 |
| 7,362,760 B2 | * | 4/2008 | Wang | 370/392 |
| 7,568,092 B1 | * | 7/2009 | Englund | 713/150 |
| 7,823,202 B1 | * | 10/2010 | Nucci et al. | 726/22 |
| 2006/0123053 A1 | * | 6/2006 | Scannell, Jr. | 707/104.1 |
| 2006/0171401 A1 | * | 8/2006 | Charles et al. | 370/401 |
| 2008/0209071 A1 | * | 8/2008 | Kubota | 709/238 |
| 2010/0071053 A1 | * | 3/2010 | Ansari et al. | 726/12 |
| 2010/0088416 A1 | * | 4/2010 | Kurita | 709/227 |
| 2010/0285774 A1 | * | 11/2010 | Ginzboorg | 455/411 |
| 2011/0046775 A1 | * | 2/2011 | Bailey et al. | 700/224 |

* cited by examiner

*Primary Examiner* — Wing Chan
*Assistant Examiner* — Tesfay Yohannes
(74) *Attorney, Agent, or Firm* — Law Office of Scott C. Harris, Inc.

(57) ABSTRACT

Network time techniques. An IP address can be assigned that is only valid for a specified time, so that the same IP address can be used for multiple different units, but each IP address is valid only for certain time periods. Another technique describes using the network to continually provide a time indication.

14 Claims, 2 Drawing Sheets

ADDRESS SHARING NETWORK

BACKGROUND

Many different devices are known which use a connection through a user's local network. Conventionally, these devices identify themselves to the network, using a network identification scheme such as an Internet address or IP address. IP addresses are intended to be unique addresses which are used by the system only once, never to be used again. DHCP servers automatically assign IP addresses to devices on the network.

The addresses may include an outside address, e.g., of the network itself, as well as the IP address of the internal device on the network, in order to contact or unambiguously describe the device.

Many such devices which assign IP addresses have a limited bank of numbers that they can use. In any case, it becomes more complex to keep track of items by their IP address.

One alternative, such as used by some schemes, defines a longer address, e.g., it uses more digits. This still requires some server to keep track of the addresses, in order to avoid address conflicts.

SUMMARY

An embodiment describes a network-connected appliance, and addresses that can be used with this network-connected appliance.

An embodiment describes addressing in a network connected device which does not constantly need input from a network.

Another embodiment describes specific network connected appliances.

Another embodiment describes a network connected appliance which automatically forms its address without a supervising server (e.g., like a DHCP server).

DETAILED DESCRIPTION

While the above describes "IP addresses", it should be understood that other forms of addresses can also be used to identify items attached to a network.

It is recognition of the current embodiment that there are really two different kinds of devices that are on the network. Some devices, such as computers, can make use of continuous network updates, e.g., for user-requested internet access or file access to other computers, or to obtain content such as media files or television.

Other devices, however, may receive updates rarely or only periodically. These latter devices typically receive updates which do not which are less time-critical.

Figure 1:
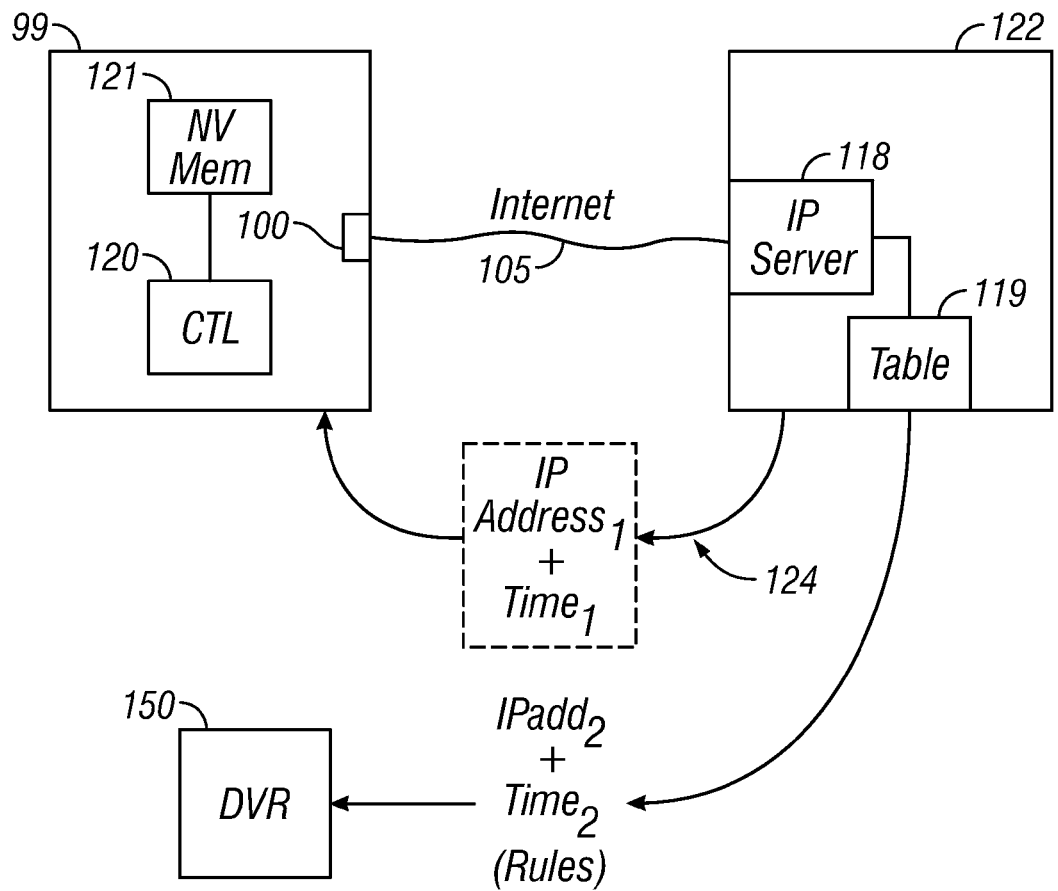
FIG. 1 shows a basic embodiment of a network connected appliance.

FIG. 1 illustrates one such device attached to the Internet, here an Internet-based clock 99. This Internet-based clock is connected to the Internet via port 100 which may be a WiFi port or may be a wired port. The Internet clock receives time information from the Internet, for example from the NIST Internet Time service which provides time that is synchronized to the National Institute of standards and technology time. This may use the network Time protocol RFC-1305.

In one embodiment, the clock itself also has the capability of maintaining time. Therefore, the time updates over the network connection 105 need only be carried out periodically. For example, the clock may have circuitry that is sufficiently accurate to maintain time between 24 hour spacings between synchronizations.

According to an embodiment, a controller 120 within the clock communicates with IP assigning server 118 in a router 122. In this embodiment, a configuration defines how often communication will be carried out. The configuration can be a preset configuration (once per day, for example) or can be a settable parameter. The indication of how often sync occurs is sent to the router as 122. The router stores an internal table 119 indicating devices and their addresses, e.g., IP addresses. This table 119 includes devices which use non-constant connection to the network. A determination is also made, by either the router or the clock, of how long each sync will take. This is used to decide how long a period will be assigned.

Based on the information stored in the internal table 119 of the router, the router returns at 124 an IP address and a time code representing a periodic time during which the IP address is valid. For example, from 12:35 PM through 12:40 PM every day, the clock 99 may have the IP address 192.168.0.254. That IP address is valid for the clock 99, however, only during those times. Other periodic times may be used; e.g., every 150 minutes, or ten minutes after every odd hour, or anything else.

This information is returned to the device 99 and stored in its network information memory 121.

Other units may also be connected to the network 105 and controlled by the router 122. For example, DVR 150 may also receive network access only once or a few times a day, e.g., for program guide updates. DVR 150 may receive the same IP address IP 192.168.0.254, but may receive different time codes that go with that IP address. In this particular situation, the IP address 192.168.0.254 may be valid over multiple time periods, for example from every hour until five minutes after every hour. The DVR 150 may receive a time message as part of the communication to maintain its future sync.

Other units may also be on the same network.

If two units attempt to communicate at the same time, it may mean that one of those units has lost its time. Accordingly, this probably indicates that one of the devices is not keeping accurate time. The router may also determine how much time adjustment is made at each interval, e.g., by asking the unit for its local time before sending the new time.

Figure 2:
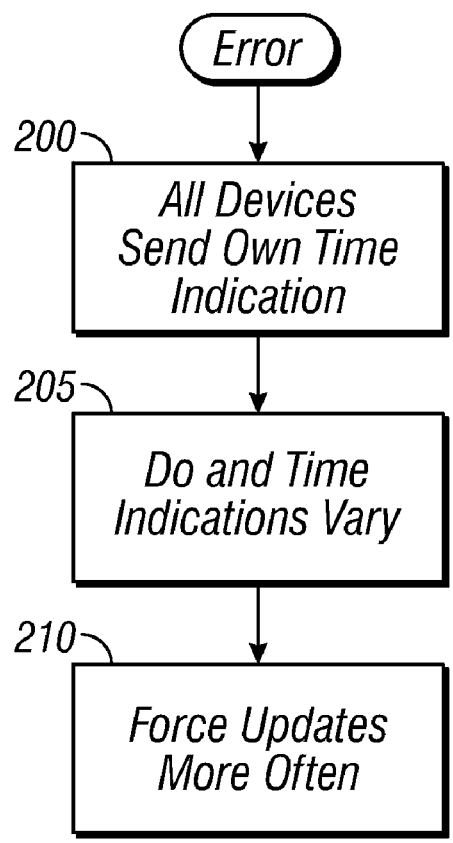
FIG. 2 shows an error handling routine for the router.

FIG. 2 illustrates an error routine which is carried out when there is a time error that is executed when there are any errors. At 200, each of the devices is commanded to determine its internal time indication. At 205, a determination is made if any of those time indications differ from the real time by more than a certain amount. In one embodiment, if the time variance is a number of minutes, the system may force updates of time at more frequent intervals, for example every four hours. If the time is erroneous by a longer period of time, the system may mark the device as possibly having an error, and check it again in the future. For example, the second time that the device has an error of this type that is uncorrectable by more frequent updates may cause the device to be marked as malfunctioning clock, and removed from the periodic IP chart.

Figure 3:
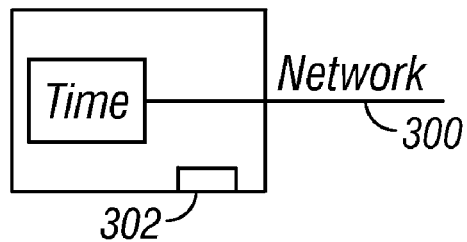
FIG. 3 shows a clockless clocked device.

Another embodiment shown in FIG. 3 receives network-based information constantly, e.g., once a second. This embodiment allows carrying out a clock function without having circuitry that forms an internal clock. Instead, this uses the time information in that network based information 300 as its internal time unit. For example, an internet based clock which displays time can simply display network time at all times. So long as the network time is up to date, the clock display will be up to date. A DVR or any clock operated device can operate in the same way.

This simplifies the circuitry, since the only circuit needed is a communication circuit. In one embodiment, the device communicates via wifi, and wholly gets its time information from the realtime wifi signals. In the embodiment, the device may have a wired connection port—here a mini usb port 302, that allows a direct connection to another device such as a laptop or network, for initial configuration. For example, a direct connection to the device may bring up a webpage that allows configuration via the locally connected computer. Other configuration techniques may also be used.

Another embodiment describes a "charm" that receives its information such as time over the network. The "charm" can also receive other information over the network such as weather or other information. The charm can change color based on the network information. In one embodiment the color of the charm can change for different current weather, e.g. be red when the weather is hot and blue when the weather is cold. The color can also change for different times of day, e.g., yellow for morning, brown for evening. The color can change for dates, e.g., white for weekdays, green for weekends.

While this calls such a device a "charm", the charm can have any desired footprint, for example, it can be a desktop device.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other applications can be used. Another embodiment can auto form the "IP" address without needing a DHCP server. A unique id in the appliance (e.g., the type and/or its serial number) are used as the IP-like address. In these embodiments, the "time assigning server" described in previous embodiments may be replaced by an automatic assigning server. This device can be used in any time-oriented electronic device, including any of the above mentioned items, as well as DVRs, TVs, sprinkler controllers, Ovens, garage openers, refrigerators (to determine times when the cooling can run less aggressively) or any other device can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   receiving a network address in a device along with at least multiple periodically occurring times during which said network address is valid; and
   providing software instructions in the device which cause the device to be used on a network, along with said network address, only during times when said network address is valid; and
   obtaining time information over the network without maintaining an independent indication of a time,
   maintaining and updating an indication of time in the device,
   using said indication of time to determine when said network address is valid, and
   using said network address only during times when said network address is valid.

2. A method as in claim 1, wherein said network address is one which is used by other devices during other times, other than when said network address is valid.

3. A method as in claim 1, wherein said multiple periodically occurring times are at least one specified time period during each of multiple different days.

4. A method as in claim 1, further comprising receiving a command to synchronize said indication of time, and providing information about said indication of time in the device responsive to said command.

5. A method as in claim 1, further comprising, prior to said receiving said network address, sending information about at least one length of time that said network address will be needed, said information about length being sent by a device that uses the network address.

6. A method as in claim 1, wherein said network is a wifi connection.

7. A network connected device, comprising:
   a network port, that connects to a network to send information to the network and receive information from the network;
   a network information memory, storing information indicative of a network address assigned by a remote router that is remote from said network port and connected to via said network, to be used during said connecting to said network, and also indicative of a time assigned by said router during which said network address to be used is valid; and
   a controller, controlling said device to communicate over the network only during said time when the address is valid and not to communicate outside said time, wherein said time assigned by said router includes periodically occurring times of at least one specified time period during each of multiple days, wherein said device does not maintain an independent indication of a current time beyond that received over the network, and only determines time by receiving data over said network.

8. A device as in claim 7, wherein said device sends information about at least one length of time that said network address will be needed prior to said receiving said network address.

9. A device as in claim 7, wherein said network port is a wireless network connection.

10. A network connected router device, comprising:
    a network port, that connects to a network; and
    a network information memory, storing information indicative of multiple different network addresses that are assigned by said router to be used by other devices during said connecting to said network, and also indicative of multiple times during which at least plural of said network addresses to be used are valid, wherein at least one of said network addresses is stored with an indication that it will be used by a first device during a first time, and used by a second device during a second time different than the first time, wherein said times include a periodically occurring time of at least one specified time period during each of multiple days for a first device, and also sends information indicative of time over the network to said first device and said second device.

11. A device as in claim 10, further comprising a controlling part, which receives information about at least one length of time that said network address will be needed.

12. A device as in claim 11, wherein said controlling part assigns at least one said network address using said length of time.

13. A device as in claim 10, wherein said network port is a wireless network connection.

14. A device, comprising:
    at least one electronic part which operates based on a current time;
    a time receiving part, which receives a current time over a network connection;
    wherein said electronic part operates based only over the time received over the network connection and does not use an internal time monitoring device for said operates.

* * * * *